3,826,773
Patented July 30, 1974

3,826,773
SILICONE COMPOSITION CONTAINING
PRETREATED SILICA FILLER
Richard C. Cooke, Jr., Elnora, N.Y., assignor to
General Electric Company
No Drawing. Continuation of abandoned application Ser.
No. 167,822, July 30, 1971. This application Apr. 11,
1973, Ser. No. 350,007
Int. Cl. C08g 51/04; C08k 1/02
U.S. Cl. 260—37 SB                          15 Claims

ABSTRACT OF THE DISCLOSURE

A composition containing a polysiloxane resin and a silica filler which has been pretreated by calcining for at least about one hour at a temperature of at least about 250° C., and/or by washing with an aqueous medium. The composition is particularly useful as a molding compound such as in the transfer molding of transistor housings.

---

This application is a continuation of application Ser. No. 167,822, filed July 30, 1971, and now abandoned.

BACKGROUND OF THE INVENTION

The present invention relates to organopolysiloxane compositions. More particularly the invention relates to organopolysiloxane compositions which are convertible to the hard, cured state by heating the composition at an elevated temperature in the presence of a curing agent wherein the present invention contemplates the use of certain specially treated silica fillers.

In the manufacture of molding resins, an organopolysiloxane resin which is convertible to the solid cured state is first manufactured. This organopolysiloxane resin is then mixed with an inorganic filler to form a homogeneous mixture. To the resulting mixture there is added a curing agent which will decompose at elevated temperatures to cross link and cure the resin. The mixture of resin, filler, and curing agent, as well as other ingredients which are compounded therein such as coloring agents, is known as the silicone molding composition. These silicone molding compositions are usually stored for periods of about two months or more before use. In many commercial molding operations it is essential that the initial curing of the silicone molding compositions be extremely rapid, e.g., in less than two minutes. If the composition does not cure quick enough, the molding process will not be economically and commercially feasible.

The most commonly used fillers for such silicone molding compositions are the finely divided reinforcing silica base fillers. These fillers when present in a silicone molding composition, however, can cause the compositions to structure and/or partially set upon standing or storage. While other inorganic fillers cause such structuring, such structuring is especially advanced with the finely divided reinforcing silica base fillers. Furthermore, the longer the time a silicone molding composition is stored, the more prevalent the structuring.

In order to provide compositions containing such silica fillers which will cure fast enough at usual curing temperatures to satisfy the demands of commercial molding operations, it has been necessary to employ relatively large quantities of curing agent such as from about 2 to about 4% by weight based upon the organopolysiloxane resin. The presence of such relative large quantities of curing agent in the silicone molding composition, however, significantly accelerates the premature setting or structuring of the composition during storage, thereby drastically reducing the shelf life of the composition. Moreover, since the curing agent or derivative formed from it during curing will remain as an impurity in the polymer composition after cure, it can adversely affect the physical and/or chemical properties of the cured composition. Accordingly, the degree of reduction in the physical and/or chemical properties of the cure composition increases as the quantity of curing agent increases. Furthermore, the use of large amounts of curing agent is disadvantageous for purely economical reasons.

It would therefore be desirable to reduce the quantity of curing agent as much as possible without an accompaning deleterious effect upon the cure time. It is therefore an object of the present invention to reduce the quantity of curing agent employed without a concomitant increase in the cure time. Another object of the present invention is to significantly increase the shelf life of the silicone composition.

It is another object of the present invention to improve such physical properties of the composition as flexural strength. Another object of the present invention is to provide silicone compositions which are useful for semi-conductor uses such as for the packaging of transistors.

These and other objects are accomplished by the silicone resin composition provided below.

BRIEF DESCRIPTION OF INVENTION

The silicone composition of the present invention comprises:

(a) a polysiloxane resin being convertible to the solid, cured, elastic state and having an average unit formula selected from the group consisting of:

(1) 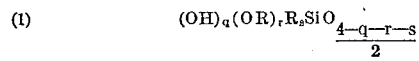

where R is selected from the group consisting of alkyl radicals; cycloalkyl radicals; alkenyl radicals; aryl radicals; aralkyl radicals; cycloalkenyl radicals, halogenated derivatives of the above radicals; and cyanoalkyl radicals; (OR) is a lower alkoxy radical containing from 1 to 8 carbon atoms per radical; $q$ has a value of 0 to 1.0, $r$ has a value of 0 to 1.0, $s$ has a value of 1.0 to 1.7; and the sum of $q+r$ has a value of 0.1 to 1.0; and containing at least 0.25% by weight of silicone-bonded groups selected from the class consisting of hydroxyl groups and lower alkoxy groups; and (2) 

wherein $R^1$ is selected from the group consisting of alkyl radicals; cycloalkyl radicals; alkenyl radicals; aryl radicals; aralkyl radicals; cloalkenyl radicals; halogenated derivatives thereof; and cyanoalkyl radicals; and $n$ has a value of from 1.98 to 2.01; and (b) a pretreated silica base filler in an amount of about 10 to about 85% by weight based upon the combined weight of (a) and (b) wherein said filler is obtained by subjecting a silica base filler to at least one of the following pretreatments:
  (1) calcining for at least about 1 hour at a temperature from about 250° C. to about 1372° C.; and
  (2) washing with an aqueous medium.

In addition, a curing agent is added to the silicone resin composition so that when the composition is heated at elevated temperature the composition will cure to a hard, elastic state.

DESCRIPTION OF PREFERRED EMBODIMENTS

The polysiloxane resins that can be used in the composition of this invention are well known materials. By the term "polysiloxane resin" it is meant polymers containing two or more siloxane units, and having an average unit formula selected from the group consisting of:

(1) 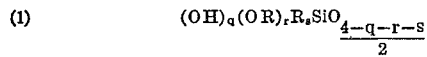

and (2) 

where R and $R^1$ are selected from the group consisting of alkyl radicals; cycloalkyl radicals; alkenyl radicals; aryl radicals; aralkyl radicals; cycloalkenyl radicals; halogented derivatives of the above radicals; and cyanoalkyl radicals; (OR) is a lower alkoxy radical containing from 1 to 8 carbon atoms per radical; $s$ has a value of 1.0 to 1.7 and preferably has a value of 1.05 to 1.45, $q$ has a value of 0 to 1.0 and preferably a value of 0.2 to 0.55; $r$ has a value of 0 to 1.0 and preferably has a value of 0.2 to 0.55 and the sum of $q+r$ has a value of 0.01 to 1.0 and preferably has a value of 0.2 to 0.55; and $n$ has a value of 1.98 to 2.01. Preferably R and $R^1$ are selected from the group consisting of lower alkyl radicals having 1 to 18 carbon atoms; cycloalkyl radicals having 5 to 7 carbon atoms in the ring; lower alkenyl radicals having 2 to 8 carbon atoms; mononuclear aryl radicals; mononuclear aryl lower alkyl radicals having 1 to 6 carbon atoms in the alkyl group; cycloalkenyl radicals having 5 to 7 carbon atoms in the ring and halogenated derivatives of these radicals.

Examples of siloxane units that can be present in the siloxane resins are $C_6H_5SiO_{3/2}$, $(C_6H_5)_2SiO$, $CH_3SiO_{3/2}$, $(CH_3)_2SiO$, $(CH_3)C_6H_5SiO$, $C_2H_5SiO_{3/2}$, $(C_2H_5)_2SiO$, $(C_2H_5)C_6H_5SiO$, $C_3H_7SiO_{3/2}$, $(C_3H_7)_2SiO$, $(C_3H_7)C_6H_5SiO$, $CH_2=CHSiO_{3/2}$, $(CH_2=CH)CH_3SiO$, $CH_2=CHCH_2SiO_{3/2}$, $(CF_3CH_2CH_2)CH_3SiO$, $ClCH_2CH_2SiO_{3/2}$, $C_6H_{11}SiO_{3/2}$, $Cl_2C_6H_3SiO_{3/2}$, $CF_3C_6H_4SiO_{3/2}$, $(C_6H_5)CF_3CH_2CH_2SiO$, $CH_3C_6H_4SiO_{3/2}$, and $C_6H_5CH_2SiO_{3/2}$.

More specifically, R and $R^1$ are selected from the class consisting of lower alkyl radicals, e.g., methyl, ethyl, propyl, butyl, octyl, and octadecyl radicals; cycloalkyl and cycloalkenyl radicals having 5 to 7 carbon atoms in the ring, e.g., cyclopentyl, cyclohexyl, cycloheptyl, and cyclohexenyl radicals; lower alkenyl radicals, e.g., vinyl and allyl radicals; mononuclear aryl, e.g., phenyl, tolyl and xylyl radicals; mononuclear aryl lower alkyl radicals, e.g., benzyl and phenylethyl radicals; halogenated derivatives of the above radicals; and cyanoalkyl radicals, e.g., chloromethyl, beta-chloroethyl, chlorophenyl, dibromophenyl and trifluoromethylethyl radicals. Preferably, R and $R^1$ are selected from the class consisting of methyl, ethyl, and phenyl.

The lower alkoxy radical, OR, is selected from the class consisting of lower alkoxy radicals having 1 to 8 carbon atoms, e.g., methoxy, ethoxy, propoxy and isopropoxy radicals and is preferably selected from the class consisting of the above specifically named radicals.

The ratio of the organic substituents to the silicone atoms in the above-described polysiloxane resin having the average unit formula (1) should be in the range of 1.0:1 to 1.7:1. Preferably, such has a phenyl to silicone ratio of 0.5:1 to 0.7:1, and other substituents to silicone ratio of 0.5:1 to 0.1:1, and a total phenyl and other substituents to silicone ratio of 1.05:1 to 1.45:1. The preferred polysiloxane resins of this invention are the phenylmethylsiloxanes having the average unit formula (1), i.e., those containing siloxane units containing phenyl groups, and siloxane units containing methyl groups. The preferred polysiloxane contains some siloxane units having two monovalent hydrocarbon substituents per siloxane unit as this adds flexibility to the cured resin. Preferably, from 5 to 45% of the siloxane units of such polysiloxanes contain two monovalent hydrocarbon substituents per siloxane unit.

In addition, those polysiloxanes having the average unit formula (1) contain at least 0.25% by weight of silicone-bonded OH and/or (OR) groups. Such can contain a much higher percentage of OH groups and preferably contains at least 5 weight percent of OH groups. It is preferable that 90% of the total OH and (OR) groups be OH groups. The (OR) groups are lower alkoxy groups having up to 8 carbon atoms, such as methoxy, ethoxy and isopropoxy groups. The presence of such groups as methylsiloxy groups in the polysiloxane aids in regulating the cure time. As the ratio of alkoxy groups to siloxy groups increases, the cure time increases.

Polysiloxanes having the average unit formula (1) which may be used in the practice of the present invention, generally speaking, are well known in the art. For example, see U.S. Pat. 2,646,441 of Duane, 3,135,713 of Brewer et al., and U.S. Pat. 3,389,114 of Burzynski et al. and the discussion therein.

The preferred polysiloxanes for use in the practice of the present invention are those having the average unit formula (1) and having a silanol (measured as OH) content of 3 to 7% by weight. The method of making such resins is generally set forth in U.S. patent application, Ser. No. 671,574 of Duane F. Merrill, filed Sept. 29, 1967, entitled "Silanol-Containing Organopolysiloxane Resins and a Method for Making Them." In addition, the preferred polymers also contain some siloxy groups which are substituted with one methyl radical per siloxy unit and these mono-substituted siloxy units also contain some alkoxy substitution. It is the siloxy units in the polysiloxane which are mono-substituted with methyl groups and which also contain some alkoxy substitution which regulates the cure time of the polymer. If the polysiloxane contains over 3% silanol by weight and contains no alkoxy groups, the cure time at high temperatures can be so fast that it would be impractical to use such in transfer or injection molding operations.

Silanol-containing organopolysiloxane resins having a silanol content of 3% to 11 or 12% can be made by hydrolyzing organohalosilanes utilizing a water immiscible organic solvent and acetone as a cosolvent. The method involves agitating a mixture comprising (A) organohalosilane preferably in combination with a lower alkyltrialkoxysilane, (B) water, (C) acetone, (D) a water immiscible organic solvent, and (E) an aliphatic monohydric alcohol having from 1 to 8 carbon atoms where there is present by weight in said mixture, per part by weight of (A),

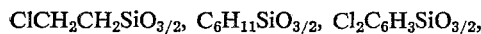

1.7 to 10 parts of (B),
0.2 to 5 parts of (C), and
0.3 to 5 parts of (D), and from 0 to 1 mole of (E) per mole of halogen attached to silicone of (A), (2) separating an organic solvent solution of (F) from the resulting hydrolysis of (1), where (F) is a silanol-containing organopolysiloxane having an average ratio of from about 1 to 1.7 organo radicals per 1 silicone atom, and (A) is selected from, (a) organotrihalosilane,
(b) a mixture of organotrihalosilane and diorganodihalosilane,
(c) the reaction product of (E) and a member selected from (a) and (b), which has an average ratio of up to 1 alkoxy radical per halogen radical,
(d) a mixture of (c) and a member selected from (a) or (b).

and where the organo radicals of (A) and (F) are attached to silicone by carbon-silicone linkages and are selected from monovalent hydrocarbon radicals, halogenated monovalent hydrocarbon radicals, and cyanoalkyl radicals.

Included by the organohalosilanes which can be employed in the practice of the invention are silanes of the formula (3)  $(R^2)_a SiX_{4-a}$ where $R^2$ is selected from the same class as R, X is a halogen radical, such as chloro, and $a$ is an integer having a value of 1 or 2. In addition, there can be employed in combination with such organohalosilanes of formula (3), an aliphatic monohydric alcohol of the formula, (4)  R'OH or an alkoxylated organosilane of the formula, (5)  $(R^3)_a (RO)_b SiX_{4-a-b}$ where $R^3$ is selected from the same class as R; X and $a$ are as defined above; $b$ is an integer equal to 1 to 3, inclusive; and the sum of $a$ and $b$ is equal to 2 to 4, inclusive.

Included by the organohalosilanes of formula (3) are for example, methyltrichlorosilane, dimethyldichlorosilane, methylphenyldichlorosilane, phenyltrichlorosilane, diphenyldichlorosilane, etc. Included by the partially alkoxylated organohalosilanes of formula (5) are reaction products of organohalosilanes of formula (3), where $R^3$ is preferably selected from the class consisting of monovalent hydrocarbon radicals and halogenated monovalent hydrocarbon radicals, with alcohols of formula (4) such as methyl alcohol, ethyl alcohol, propyl alcohol, isopropyl alcohol, butyl alcohol, etc.

In instances where the aliphatic monohydric alcohol of formula (4) is utilized in the practice of the invention, the alcohol can be added directly to the organohalosilane of formula (3) before hydrolysis, or it can be added to the hydrolysis mixture prior to the addition of the organosilane. As a result, the silanol-containing organopolysiloxane of the present invention can be free of or contain chemically combined alkoxy radicals attached to silicone.

The preferred polysiloxane resins of the present invention having the average unit formula (1) can have from 3% to 12% and preferably from 5% to 7% by weight of hydroxy radicals attached to silicone. These polymers are friable fast curing molding materials when at 100% solids. Experience has shown that in most instances, the average ratio of the R radicals to silicone will determine the nature of the polysiloxane and its utility. For example, polymers at 100% solids, having an average ratio of about 1 to about 1.2 R radicals per silicone atom, a silanol content of from 3% to 12% by weight, with or without chemically combined alkoxy radicals, are generally friable, and suitable for molding applications. These moldable materials have been found to soften at temperatures as low as 60° C., and generally flow at temperatures between 70° C.–90° C.

In accordance with the method of the invention, hydrolysis is achieved by agitating the organohalosilane in the presence of water, acetone, and organic solvent. The organic layer is separated from the acid layer which forms during hydrolysis. The organic phase then is stripped to produce a 100% solids polysiloxane.

Although the order of addition of the various ingredients is not especially crucial, it is preferred to add the organohalosilane to the mixture of water, acetone, and organic solvent. Preferably, a proportion of from 2 to 6 parts of water, 0.3 to 2 parts of acetone, and 0.6 to 2 parts of organic solvent, per part of organohalosilane can be employed. Suitable organic solvents are for example, any water immiscible organic solvent which is inert to the hydrolysis reactants during hydrolysis, and in which the hydrolyzate is soluble, to provide for its separation from the aqueous layer. For example, there can be employed a hydrocarbon such as benzene, toluene, xylene, etc., esters such as butyl acetate and ethyl acetate; ethers such as diethyl ether, dioxane, etc. During the addition, the mixture is agitated to provide for a sufficient degree of hydrolysis of the organohalosilane and formation of the organopolysiloxane hydrolyzate. The temperature of the hydrolysis mixture can be controlled by the rate of addition, or external heat or cooling can be employed if desired. During hydrolysis, a temperature between 0° C. to 80° C. has been found effective, while a temperature between 20° C. to 40° C. is preferred. After the addition has been completed, the mixture can be stirred for an additional period of time, such as 30 minutes or more to allow for complete hydrolysis of the organohalosilanes. The mixture is then allowed to settle and the acid layer can be drawn off from the organic layer. The organic layer can then be stripped of solvent to 100% solids.

When making molding materials, it has been found expedient to strip under reduced pressure, such as a pressure between 25 mm. to 500 mm. Hg to a solids concentration of from 50% to 70% by weight of the polysiloxane solution. Polymer impurities can be removed at this solids concentration, such as by filtration, centrifuging, etc. Further stripping can be employed to 100% solids at a temperature sufficient to remove all of the residual solvent. For example, when stripping toluene, a temperature up to 130° C. has been found effective.

In instances where the average R to Si ratio is above 1.2, for example, 1.2 to 1.4 or above, it is preferred to strip at atmospheric pressure to a solids concentration of up to about 95%. If it is desired, the polymer can be refluxed 2 to 3 hours at temperatures between 190° C. to 230° C., to further improve the characteristics of the polysiloxane.

Concerning the polysiloxane resin of the present invention which has the average unit formula (2), it is preferred that at least 50% of the $R^1$ groups in formula (2) are methyl radicals and the rest are phenyl radicals. Further, preferably 0.1–1% of the $R^2$ groups in formula (2) are vinyl.

There are also within the scope of formula (2) polyorganosiloxanes which can be copolymers containing two or more different diorganosiloxane units therein and copolymers of dimethylsiloxane units and methylphenylsiloxane units; or copolymers of methylphenylsiloxane units, diphenylsiloxane units, dimethylsiloxane units and methylvinylsiloxane units, as well as copolymers of dimethylsiloxane units, methylvinylsiloxane units and diphenylsiloxane units.

Preparation of the diorganopolysiloxane of formula (2) which can contain both saturated and olefinically unsaturated hydrocarbon groups may be carried out by any of the procedures well known to those skilled in the art. Such polysiloxanes can be produced by following a procedure involving hydrolysis of one or more hydrocarbon-substituted dichlorosilane in which the substituents consist of saturated hydrocarbon groups to produce a crude hydrolyzate containing a mixture of linear and cyclic polysiloxanes. Further, one or more hydrocarbon-substituted dichlorosilanes whose hydrocarbon substituents comprise one or more olefinically unsaturated hydrocarbon groups are hydrolyzed to produce a crude hydrolyzate containing a mixture of linear and cyclic polysiloxanes. The two crude hydrolyzates are depolymerized by being treated with KOH to form mixtures of low boiling, low molecular weight cyclic polymers and undesirable material such as the monofunctional and trifunctional chlorosilane starting material. The resulting compositions are fractionally distilled and there is collected two pure products containing the low boiling, low molecular weight cyclic polymers free of any significant amount of monofunctional and trifunctional groups.

In order to depolymerize the crude hydrolyzates, there is added to them a catalyst and the mixture is heated at a temperature above 150° C. to produce and recover by evaporation a product consisting of low molecular weight cyclic polysiloxanes comprising, for example, about 85% of the tetramer and 15% of the mixed trimer and pentamer. When the hydrocarbons on the silicone atom are methyl, materials resulting from the presence of monomethyltrichlorosilane in this initial product produced from dimethyldichlorosilane remain as residue in the distillation vessel or tower.

The distillate consisting essentially of low molecular weight cyclic dimethyl polymers, free of any significant amount of monofunctional and trifunctional groups is collected in a vessel. The then dried cyclic siloxane contains less than 5 p.p.m. of water. The cyclic methylvinyl and diphenyl cyclic siloxanes are prepared in the same way.

The pure cyclic siloxanes are added in the desired proportions in a reaction vessel so as to be subjected to an equilibration reaction to form the polysiloxanes of formula (2). Thus, about 2.5–17 mole percent cyclic diphenylsiloxane can be added to 83–97.5 mole percent dimethyl cyclic siloxanes. If desired, and depending on the type of compound that is to be produced, 0.1–1.0 mole percent of methylvinyl cyclic siloxane may be mixed with the dimethyl and diphenyl cyclic siloxane or other desired proportions of the cyclic siloxanes may be used to produce the desired polymer. To the above mixture of pure cyclic siloxanes there is added as a polymerization catalyst, such as KOH. The KOH breaks the ring of cyclic siloxanes to form a potassium silanolate which has the formula,

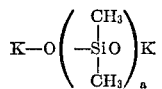

This compound, the potassium silanolate, thus can attack other cyclics to break the rings and increase the chain length of the siloxanes formed. There is further added to the reaction mixture an amount of one or more monofunctional compounds calculated to function as end-blockers for limiting the degree of polymerization and consequently the lengths and molecular weights of the linear polysiloxane chain, and for stabilizing the polymers. Usually a small amount of monofunctional compounds are added to function as end-blockers so as to regulate the chain length of the polymers. Preferably, a compound is used as the chain-stopped groups having the formula,

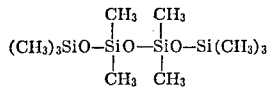

Other monofunctional compounds that may be employed satisfactorily for controlling polymer growth include, among others, hexamethyldisiloxane, tetramethyldiethoxydisiloxane, diethyltetraethoxydisiloxane and divinyltetraethoxydisiloxane.

The equilibration reaction is carried out from 2 to 4 hours until about 85% of the cyclic diorganosiloxanes have been converted to polymers end-stopped with monofunctional groups. When the 85% conversion point has been reached, there are just as many polymers being converted to the cyclic siloxanes as there are cyclic siloxanes being converted to the polymer. At that time there is added to the mixture a sufficient amount of an acid donor, such as phosphorous acid, that will neutralize the KOH catalyst so as to terminate the polymerization reaction. The cyclic diorganosiloxanes in the reaction mixture are then distilled off to leave the polydiorganosiloxane resin which is useful in the present invention.

Alternatively, the mixture of polyorganosiloxane may be then further reacted with the cyclic siloxanes therein and then during compounding of the mixture with process aid and fillers on a doughmixer, the remaining cyclic siloxanes may be removed by a gas purge.

The polydiorganosiloxane is produced so that it preferably registers a penetration of 50–4,000 mm. per minute on a standard penetrameter. Further, the polymer preferably has a molecular weight in the range of 100,000 to 2,000,000 and a viscosity of 1,000,000 to 100,000,000 centipoise.

Hydrocarbon-substituted polysiloxanes whose pendant groups consist largely of groups other than methyl, such as ethyl or other saturated hydrocarbon groups and olefinically-unsaturated hydrocarbon groups other than, or in addition to, vinyl groups can be produced by means of procedure similar to that described above or by means of procedures modified in accordance with the known characteristics of the various hydrocarbon groups to be included.

The polyorganosiloxane resin having the average unit formula (2) is preferably produced under conditions so controlled as to avoid the incorporation therein of any significant amounts of trifunctional compounds, groups, or molecules to avoid crosslinking of linear polysiloxane chains through silicon and oxygen atoms and the incorporation therein of any significant amount of monofunctional compounds or radicals than those specifically provided to serve as end-blockers for limiting the degree of polymerization. Accordingly the starting polyorganosiloxane resin having the average unit formula (2) contains 2.0 hydrocarbon groups per silicon atom. Deviations from a ratio of 2 to 1, for example, ratio of 1.98 to 2.01, will be insignificant for all practical purposes since it will attribute to the presence of other hydrocarbon groups whose total numbers will be insignficant as compared with the total number of hydrocarbon groups attached to silicon atoms of linear polysiloxane claims.

Any of the silica base fillers as customarily employed in the prior art can be subjected to the specified pretreatment described herein and then employed in the silicon resin compositions of the present invention. Usually the silica base fillers pretreated according to the present invention are the highly reinforcing type or structure defining silica base fillers and preferably are finely divided. Most preferably the fillers treated according to this invention are the finely divided fused silica fillers. Generally such fused silica fillers have a particle diameter of less than about 300 microns. Preferably the fused silica filler subjected to the pretreatment of the present invention passes through a 325 mesh sieve, has a diameter less than 45 microns, and has a surface area of about 7 to 11 square meters per gram. In addition such a filler usually has a diameter of at least 2 microns.

According to the present invention, the filler is subjected to a pretreatment which includes calcining and/or washing prior to incorporation in the polysiloxane resin. The calcining treatment involves heating the silica base filler for at least about 1 hour at a temperature from about 250° C. to about 1372° C. Usually calcining for 20 hours is more than sufficient for the purposes of this invention. Preferably the calcining is carried out by heating the filler for about 3 to about 10 hours at a temperature from about 350 to about 600° C. The heat treatment can be conducted in any suitable oven or heating chamber capable of achieving the desired temperatures. It is understood that the time is inversely related to the temperature. For instance, when a temperature near the lower end of the range is employed, it is preferred to treat the filler for a period of time near the upper end of the time range. Conversely, it is preferred that the calcining be carried out for a period of time near the lower end of the time range when temperatures approaching the upper end of the range are employed.

The washing pretreatment which may be employed in the present invention involves contacting the filler with an aqueous medium. The contacting of the filler with the aqueous medium can include any of the known means of intimately contacting a liquid and solid material such as forming a slurry of the filler in the aqueous medium, or passing the aqueous medium through a fixed or moving bed of the filler. When the washing is carried out by slurring the filler in the aqueous medium, the separation of the filler and aqueous medium from each other is initially accomplished by centrifugation and/or filtration. In addition, it is advantageous to subject the filler to elevated temperatures after the washing procedure and after the filler and aqueous medium have been separated from each other to effect drying of the filler. The drying of the filler is important since the presence of water can promote premature setting of the composition during storage. Of course, since the heating step conducted after washing is primarily for drying, it need not be as severe as the above-described calcining treatment. Generally at least about 2 parts and preferably at least 3 parts by weight of aqueous medium per part of filler are employed for the washing treatment. The maximum amount of aqueous medium which can be employed is primarily determined by such practical considerations as equipment capacities and economics. Of course, the particular quantity of aqueous medium employed will depend upon such variables as the particle size, surface area, and porosity of the particular filler being treated. The aqueous medium can contain liquid materials other than water. Such liquids include organic solvents such as toluene and benzene.

It has been observed that the calcining and/or washing treatments cause a noticeable increase in the pH of the filler. For instance, the preferred fused silica fillers initially have a pH of about 5.0 to about 6.0; whereas, the treated silica fillers have a pH of at least 0.5 pH units greater than the untreated filler. The following table demonstrates the effect of various treatments upon pH:

| Type of treatment: | pH |
|---|---|
| None | 5.6 |
| Calcine for 4 hours at 450° C. | 6.2 |
| Calcine for 8 hours at 450° C. | 7.1 |
| Wash with 2 parts H₂O per part filler and repeat 5 times. Then dry for 2 hours at 150° C. | 6.1 |
| Wash with 2 parts H₂O per part filler and repeat 5 times. Then dry for 4 hours at 450° C. | 6.4 |

The preferred pretreatment step is the calcining process. Calcining is easier to carry out than the washing procedure. For example, the washing procedure requires the use of an additional reagent which must be checked periodically to ensure it does not introduce impurities which could adversely affect the filler. In addition, the calcining requires only one step; whereas, the washing procedure involves a plurality of processing steps such as contacting, separation, and usually drying.

The amount of pretreated filler employed is usually between about 10% and about 90%, and preferably between about 40 and about 70% by weight based upon the combined weight of the polysiloxane resin and treated filler. It is understood that the silicone resin composition can contain silica base filler which has not been treated according to this invention. Of course, the maximum benefits afforded by the present invention will usually not be attained by such compositions which contain some untreated filler. The degree of improvement obtained by such compositions will depend upon the type and amount of untreated filler and the type and amount of treated filler in the final composition. However, as long as the composition contains at least about 10% by weight of pretreated silica base filler based upon the combined weight of the polysiloxane resin and pretreated filler, the advantages obtained by the present invention will be quite significant and will represent a drastic improvement over the prior art.

It has surprisingly been found that by pretreating the silica filler according to the present invention, the amount of curing agent necessary to achieve acceptable cure rates is drastically reduced. For instance, compositions which contain untreated instead of the treated silica filler require at least twice as much and usually at least about 3 times as much curing agent as do the compositions of the present invention to achieve comparable cure rates. The reduction in the level of curing agent in turn significantly increases the shelf life of the composition such as from a few days to several months.

Besides the extremely beneficial effect upon curing agent and shelf life, the pretreatment according to the present invention greatly improves the physical properties of the composition, and particularly the flexural strength of the composition after aging at elevated temperatures. This is especially surprising since the initial flex strength of the composition of the present invention is inferior to that of a composition wherein the silica filler has not been pretreated according to the present invention.

The curing of the silicone resin composition of the present invention is usually effected by chemical vulcanizing agents, and any of the conventional curing agents can be employed. The selection of a particular type of curing agent will depend somewhat on the particular polysiloxane employed in the composition. For instance, when the polysiloxane resin employed is one having the average unit formula (1), then the preferred curing system is a composition containing (1) lead carbonate and/or lead monoxide; and
(2) an anhydride of a carboxylic acid.

The amount of lead monoxide or lead carbonate used is generally from about 0.01 to about 5% and preferably from about 0.1 to about 1% by weight based upon the total weight of the polysiloxane resin and the curing system of the lead compound and the carboxylic acid or derivative.

Examples of some suitable carboxylic acids include resin acids, linoleic acid, stearic acid, oleic acid, acetic acid, butyric acid, naphthenic acid, octoic acid, benzoic acid, 2-ethylhexanoic acid, lauric acid and palmitic acid.

Specific examples of some suitable ammonium salts include ammonium acetate, ammonium laurate, ammonium oleate, ammonium palmitate, ammonium benzoate and ammonium stearate.

The mole ratio of acid or acid salt to the lead compound usually is not below about 0.1:1 and preferably is at least about 0.2:1. Of course, the acid or acid salt can be employed in amounts in excess of the above-mentioned threshold quantities. For instance, the acid or acid salt can be employed in amounts of at least 1 mole per mole of lead compound.

It is preferred, however, to employ an anhydride of a carboxylic acid since such provides a curable polysiloxane composition which possesses increased shelf life and increased initial and final gel times without increasing cure times as compared to a polysiloxane composition differing only in the use of the corresponding acid or acid salt in the curing system.

The anhydrides which are useful in the present invention include anhydrides of saturated and unsaturated aliphatic carboxylic acids; anhydrides of aromatic carboxylic acids; anhydrides of cycloaliphatic carboxylic acids; and anhydrides of substituted carboxylic acids such as halo-substituted organic carboxylic acids. The carboxylic acids can be mono or polycarboxylic acids but preferably are monocarboxylic acids. In addition, it is recognized that the anhydrides suitable for the present invention can be obtained from mixtures of carboxylic acids. Such mixtures could include different saturated and/or unsaturated aliphatic carboxylic acids; different cycloaliphatic carboxylic acids; different aromatic carboxylic acids; or an aromatic carboxylic acid and an aliphatic carboxylic acid.

Usually the aliphatic acids from which suitable anhydrides can be obtained contain up to about 22 carbon atoms such as acetic acid, citraconic acid, maleic acid, propionic acid, n-butyric acid, 2,3-dimethyl maleic acid, stearic acid, itaconic acid, succinic acid, n-decyl succinic acid, and methyl succinic acid. The cycloaliphatic acids from which suitable anhydrides can be obtained generally contain 4 to 6 carbon atoms in the cycloaliphatic ring such as cyclobutane carboxylic acid, 1,2,3,4-cyclopentanetetracarboxylic acid, 1,2-cyclohexane dicarboxylic acid, and 4-cyclohexene-1,2-dicarboxylic acid. The aromatic acids from which suitable anhydrides can be derived can be mononuclear such as benzoic acid, terephthalic acid, pyromellitic acid, or polynuclear such as 1,8-naphthalic acid.

Some examples of suitable anhydrides of carboxylic acids include acetic anhydride, pyromellitic dianhydride, benzoic anhydride, bromomaleic anhydride, n-butyric anhydride, chloromaleic anhydride, citraconic anhydride, cyclobutane carboxylic acid anhyride, 1,2-cyclohexane dicarboxylic anhydride, 4-cyclohexene-1,2-dicarboxylic anhydride, 1,2,3,4-cyclopentanetetracarboxylic dianhydride, n-decyl succinic anhydride, 2,3-dimethyl maleic anhydride, itaconic anhydride, maleic anhydride, methyl succinic anhydride, 1,8-naphthalic anhydride, propionic anhydride, tetrachlorophthalic anhydride, 3,4,5,6-tetrahydrophthalic anhydride, stearic anhydride, and the mixed anhydride of acetic and benzoic acids. The preferred anhydrides are benzoic anhydride, stearic anhydride, and acetic acid, with the most preferred being benzoic anhydride. The anhydride can be selected according to its decomposition temperature so that it becomes an active portion of the curing system at or near the desired cure temperature for the polysiloxane.

The anhydride of the carboxylic acid, if used, should be present in the composition in an amount sufficient to provide at least about 0.25 of the carboxylic acid anhydride group.

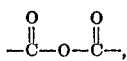

and preferably at least about 0.35 of the carboxylic acid anhydride group per mole of the lead compound. Of course, the anhydride can be employed in amounts in excess of the above-mentioned threshold quantities. For instance, the anhydride can be present in an amount sufficient to supply at least 3.5 carboxylic acid anhydride groups per mole of the lead compound. Accordingly, the weight of the anhydride to be used based upon the total composition will depend upon the molecular weight of the anhydride employed and the number of anhydride groups present in the anhydride.

When the polysiloxane resin employed is one having the average unit formula (2), the preferred curing agents are organic peroxides conventionally used to cure silicone elastomers. Especially suitable are the dimethyl peroxides which may have the structural formulas,

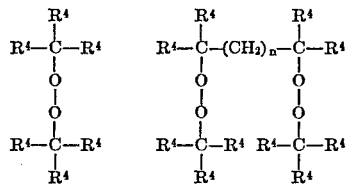

wherein $R^4$ represents the same alkyl group throughout or alkyl groups of two or more different types and $n$ is zero or a larger integer.

Among the specific peroxide curing agents that are preferred are di-tertiary-butyl peroxide, tertiary-butyl triethylmethyl peroxide, tertiary-butyl-tertiary butyl-tertiary-butyl triphenyl peroxide and di-tertiary alkyl peroxide such as dicumyl peroxide. Other suitable peroxide curing agents which effect curing through saturated as well as unsaturated hydrocarbon groups on the silicon chain are aryl peroxides which include benzoyl peroxides, mixed alkyl-aryl peroxides which incluude tertiary-butyl perbenzoate, chloroalkyl peroxides such as 1,4-dichlorobenzoyl peroxide; 2,4-dichlorobenzoyl peroxide, monochlorobenzoyl peroxide, benzoyl peroxide, etc. Generally, 0.1–10% of said peroxide by weight of the polyorganosiloxane gum is used to cure the silicone rubber composition and preferably 0.5–3.0% by weight.

There may also be employed in the present composition 1 to 75% and preferably 5 to 50% by weight based on the polyorganosiloxane resin of a process aid for preventing the resin and the filler mixture from structuring prior to curing and after compounding. One example of such a process aid is a compound of the formula, (6) 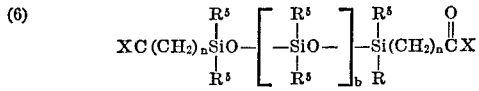

where $R^5$ is a member selected from the class consisting of methyl and phenyl, X is a member selected from the class consisting of —OH, —NH$_2$ or —OR$^6$, where $R^6$ is methyl or ethyl, $n$ has a value of from 2 to 4, inclusive, and $b$ is a whole number equal to from 0 to 10, inclusive. Further details as to the properties, as well as the method of preparation of the compound of formula (6) are to be found in the disclosure of Martellock U.S. Pat. 3,464,945 which is herein incorporated by reference.

The process aid may also be a dihydrocarbon-substituted polysiloxane oil having a hydrocarbon substituent to silicon atom ratio of from 1.6 to 2.0 and whose hydrocarbon substituents comprise at least one member selected from the class consisting of methyl, ethyl, vinyl, allyl, cyclohexenyl and phenyl groups, said polysiloxane oil comprising polysiloxane molecules containing an average of from one to two lower alkoxy groups bonded to each of the terminal silicon atoms where the alkoxy groups are selected from the class consisting of methoxy, ethoxy, propoxy and butoxy.

Preparation of the alkoxy-containing hydrocarbon-substituted polysiloxane oils that can be employed as a process aid in the present invention can be carried out by producing one or more types of cyclic dihydrocarbon-substituted polysiloxanes from one or more types of dihydrocarbon-substituted dichlorosilanes and dialkoxysilanes in accordance with the hydrolysis, depolymerization and fractional distillation procedures described in detail above with reference to the preparation of the resin of formula (2). Then one or more types of cyclic siloxanes so produced are mixed with predetermined amounts of a dihydrocarbon-substituted dialkoxysilane and the mixture is subjected to an equilibration treatment under controlled conditions to produce the desired alkoxy end-blocked hydrocarbon-substituted linear polysiloxane oil.

The alkoxy-containing hydrocarbon-substituted polysiloxane oils suitable for use in the present invention are relatively low molecular weight polysiloxane oils whose polymer chains have at least 4 and as much as 35 and more dihydrocarbon siloxy units per molecule. The polysiloxane oils preferably have an average of at least 1 and not more than 2 alkoxy groups bonded to each of the terminal silicon atoms of the molecule. A more detailed disclosure of the alkoxy end-blocked polysiloxane process aids, as well as their method of preparation, is to be found in the disclosure of Fekete, U.S. Pat. 2,954,357 which is hereby incorporated into this specification by reference.

There may also be used as a process aid hydroxylated organosilanes which contain from 1 silicon-bonded hydroxyl per 70 silicon atoms to 2 silicon-bonded hydroxyls per silicon atom and contains from 1.9 to 2.1 hydrocarbon radicals per silicon atom. The remaining valences of the silicon atom are satisfied by oxygen atoms. The hydroxylated materials include both monomers such as diphenylsilanediol and polymeric materials which contain 2 silicon-bonded OH groups in the molecule. In addition, the hydroxylated organosilane may be a mixture of hydroxyl-containing siloxanes and completely condensed siloxanes. Irrespective of the particular composition of the hydroxylated organosiloxane, it is necessary that there be present in said organosiloxane from 1 OH to 70 silicon atoms to 2 OH per silicon atom.

The hydroxylated siloxanes may be prepared by any suitable method, such as heating said siloxanes with steam under pressure at temperatures of about 120° C. or hydrolyzing silanes of the formula $$R_n{}^7SiX_{4-n}$$

where X is any hydrolyzable group such as Cl, OR⁷, H, —OR⁷ and R⁷ is a monovalent hydrocarbon radical. The former method is preferred for the preparation of those hydroxylated materials in which the hydrocarbon radicals are alkyl, while the latter method is best for the siloxanes in which hydrocarbon radicals are monocyclocarbyl hydrocarbon radicals. Further, detailed information as to the hydroxylated organosiloxanes which may be used as process aids is to be found in Konkle et al. U.S. Pat. 2,890,188, the disclosure of which is being incorporated into this application by reference.

Any of the above process aids may be used alone or mixtures thereof may be used in the above-defined concentrations. Further, other suitable process aids may also be used in the silicone rubber compositions of the present invention.

Also, if desired, fillers and pigments, in addition to the silica base fillers, can be employed. For example, such filler materials as titanium, ion oxide, aluminum oxide, as well as the inorganic filler materials known as inert fillers which can include among others, calcium carbonate can preferably be employed in combination with the preferred highly-reinforcing silica fillers to improve the tensile strength or the hardness of the elastomeric product. Other examples of suitable fillers are zinc oxide, barium sulfate, and zinc sulfide.

In addition to the above ingredients, varying amounts of conventional additives including release agents such as calcium or aluminum stearate and preservatives can be employed in the composition.

The procedure generally followed in making the compositions of the present invention generally involves the following:

The materials which are to be added to the resin are blended together, e.g., fillers such as glass fibers mixed with the pretreated silica filler; a release agent such as calcium stearate; a processing aid such as a polysiloxane oil; along with color pigments and catalyst such as lead carbonate and benzoic anhydride in a high speed blade mixer at a speed on the order of 4,000 r.p.m. for approximately 4 minutes. After the ingredients are thoroughly mixed, the silicon resin is added to the mixer and is mixed in with the other components at a speed of about 2,000 r.p.m. for approximately 2 minutes. The molding compound is then made by transferring the blend from the mixer into a hopper which feeds a double screw conveyor. The blended composition is cooled to room temperature on a conveyor and then granulated in a grinder to a particle size of approximately 10 mesh. This 10 mesh particle size molding compound can be used, as is in an injection, transfer or compression molding apparatus or can be pelletized before use in such molding apparatus.

Of course, other procedures can be used to blend the ingredients of the composition so long as a substantially uniform blend in obtained.

The following examples wherein all parts are by weight unless stated to the contrary are illustrative of the practice of the present invention.

EXAMPLE A

Preparation of Polysiloxane Resin

A silane blend composed of 220 parts of methyltriisopropoxysilane, 260 parts of methyltrichlorosilane, 470 parts of phenyltrichlorosilane, and 50 parts of dimethyldichlorosilane is hydrolyzed in a mixture of toluene, acetone, and water. For every thousand parts of the silane blend, there is 4547 parts of the toluene-acetone-water mixture. The mixture is composed of 825 parts of toluene, 722 parts of acetone, and 3,000 parts of water.

The hydrolysis is carried out by adding the silane blend to a preheated mixture of the toluene, acetone, and water. The silane blend is added over a 25-minute period, during which time the temperature of the hydrolysis mixture goes from 25° C. to 70° C. After the silane addition is completed, the hydrolyzate is agitated for 5 minutes. The agitation is stopped and the layers separate very rapidly. As soon as the separation is completed, the resin is transferred into a bodying kettle and vacuum stripped at 40° C. to a solids content of 50%.

The resin which is formed by the aforedescribed hydrolysis process is then vacuum dried using a continuous film evaporator. When all of the solvent is removed, the resin is then cast, cooled to room temperature, and ground to a fine powder. The resin should not be exposed to any appreciable amount of atmospheric moisture as it picks up water which causes gassing when the resin is used in a molding operation. It is also necessary to perform the entire hydrolysis, drying and grinding operation in equipment which does not add any catalytic metal, especially iron, to the high silanol resin. In the present example, as much of the equipment as is possible is glass-lined.

EXAMPLE B

Pretreatment of Silica Filler

A commercially available finely divided fused silica possessing the following properties:

| | |
|---|---|
| Maximum particle diameter | <45 microns. |
| Minimum particle diameter | ≥2 microns. |
| Surface area | 7–11 m.²/gram. |
| pH | 5.6. |
| Color | White. |
| Specific gravity | 2.0. |
| Continuous use | 2000° F. |
| Melting point | 3100° F. |
| Thermal expansion in./in./° F. | $0.3 \times 10^{-6}$. |
| SiO₂ content | ≥99.4%. | is placed in an oven wherein it is calcined for 8 hours at 450° C. The calcined silica has a pH of 7.1.

EXAMPLE 1

A molding compound is made by adding to a high speed blade mixer, 200 parts of the calcined fused silica filler of Example B; about 0.9 parts carbon black; about 1.1 parts candelilla wax; about 11 parts of a disilazane treated colloidal fume silica; 120 parts of ⅛" chopped glass fibers; 1.54 parts of lead carbonate; 0.4 parts benzoic anhydride; and 2.76 parts of silanol-stopped dimethylpolysiloxane fluid containing 5–20 mole percent diphenylpolysiloxane units, and having a viscosity of 50–1000 cps.

The components are mixed in a high speed blade mixer at a blade speed of 4,000 r.p.m. for 4 minutes. After the ingredients are thoroughly mixed, 135 parts of the polysiloxane resin of Example A is added to the mixture, and is mixed in with the other components at a speed of 2,000 r.p.m. for 2 minutes.

The blend which is formed is then transferred from the mixer into a hopper which feeds a double screw extruder. The composition is cooled to room temperature in a conveyor and granulated in a grinder to a particle size of approximately 10 mesh. The molding compound is then heated in a die for 2 minutes at 175° C. and 800 p.s.i. to produce a ½" x ¼" x 5" test specimen. The test specimen produced is rigid, unblistered and free of voids. The uncured material has a shelf life of at least 3 months.

A second molding composition is prepared and molded as above with the same amount and same type of ingredients except that the fused silica filler is an "untreated" filler which is not calcined and the curing agent is 4.62 parts of lead carbonate and 1.2 parts of benzoic anhydride. The curing agent is increased in order to obtain an acceptable cure time. The uncured material has a shelf life of only 2 days.

The flexural strength for both cured compositions as determined according to ASTM Standard D 790 at various conditions is given below:

| Hours of aging at 250° C. | Flexural strength (p.s.i.) | |
| --- | --- | --- |
|  | Composition containing "treated" filler | Composition containing "untreated" filler |
| 0 | 7,500 | 9,000 |
| 2 | 9,400 | 9,700 |
| 24 | 9,600 | 8,300 |
| 72 | 9,400 | 6,200 |

A comparison of the results obtained from both of the above compositions clearly demonstrates the tremendous increase in shelf life and physical properties achieved by the present invention along with the use of considerably lesser amounts of curing agent.

I claim:

1. A composition comprising (a) an uncured silicone resin containing at least 0.25% by weight of silicon-bonded groups selected from the class consisting of hydroxyl groups, lower alkoxy groups, and mixtures thereof of the average unit formula,

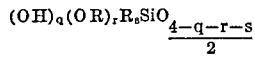

where R is selected from the class comprising lower alkyl radicals having 1 to 8 carbon atoms; cycloalkyl radicals having 5 to 7 carbon atoms in the ring; lower alkenyl radicals having 2 to 8 carbon atoms; mononuclear aryl radicals; mononuclear aryl lower alkyl radicals having 1 to 6 carbon atoms in the alkyl group; and halogenated derivatives of the above radicals; (OR) is a lower alkoxy radical containing from 1 to 8 carbon atoms per radical; $q$ has a value of 0 to 1.0, $r$ has a value of 0 to 1.0; $s$ has a value of 1.0 to 1.8; and the sum $q+r$ has a value of 0.01 to 1.0; and (b) a dry pretreated silica base filler in an amount of about 10 to 90% by weight based upon the combined weight of (a) and (b); and wherein said pretreated filler is obtained by subjecting a silica base filler to at least one of the following processes
   (1) calcining for at least about 1 hour at a temperature from about 250° C. to about 1372° C.; and
   (2) washing with at least about 2 parts by weight of aqueous medium per part of filler and thereafter drying the washed filler, wherein said uncured silicone resin is prepared by the process comprising, in combination, the steps of,
(A) agitating a mixture of
   (3) organohalosilane
   (4) from about 1.7 parts to about 10 parts by weight of water, per part of organohalosilane,
   (5) from about 0.2 to about 5 parts by weight of acetone, per part of organohalosilane,
   (6) from about 0.3 part to about 5 parts by weight of a water immiscible organic solvent, per part of organohalosilane, and
   (7) from 0 to about one mole of an aliphatic monohydric alcohol having from 1 to 8 carbon atoms, per mole of halogen attached to the silicon or the organohalosilane,
(B) separating an organic solvent solution of a silanol-containing polyorganosiloxane having an average ratio from about 1 to 1.8 organo radicals per silicon atom from the resulting hydrolysis mixture, said organohalosilane being selected from the group consisting of,
   (8) organotrihalosilane,
   (9) a mixture of organotrihalosilane and diorganodihalosilane,
   (10) a reaction product of an aliphatic monohydric alcohol having from 1 to 8 carbon atoms and a member selected from the group consisting of organotrihalosilane, and a mixture of argonotrihalosilane and a diorganodihalosilanes; which reaction product has an average ratio of up to one alkoxy radical per halogen radical,
   (11) a mixture of the reaction product of (c) and a member selected from the organotrihalosilane and diorganodihalosilane,
and where the organo radicals of the organohalosilane and the silanol-containing polyorganosiloxane are attached to silicon by carbon-silicon linkages and are selected from the group consisting of monovalent hydrocarbon radicals, halogenated monovalent hydrocarbon radicals, and cyanoalkyl radicals.

2. A process for forming a curable silicone composition comprising: (a) subjecting a finely divided reinforcing type silica base filler to at least one of the following treatments:
   (1) calcining said filler for at least about 1 hour at a temperature from about 250° C. to about 1372° C.; and
   (2) washing said filler with aqueous medium and thereafter drying the washed filler,
(b) thereafter mixing the treated filler with a composition comprising an uncured silicone resin containing at least 0.25% by weight of silicon-bonded groups selected from the class consisting of hydroxyl groups, lower alkoxy groups and mixtures thereof of the average unit formula,

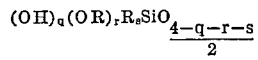

where R is selected from the class comprising lower alkyl radicals having 1 to 8 carbon atoms; cycloalkyl radicals having 5 to 7 carbon atoms in the ring; lower alkenyl radicals having 2 to 8 carbon atoms; mononuclear aryl radicals; mononuclear aryl lower alkyl radicals having 1 to 6 carbon atoms in the alkyl group; and halogenated derivatives of the above radicals; (OR) is a lower alkoxy radical containing from 1 to 8 carbon atoms per radical; $q$ has a value of 0 to 1.0, $r$ has a value of 0 to 1.0; $s$ has a value of 1.0 to 1.8; and the sum of $q+r$ has a value of 0.01 to 1.0; wherein said uncured silicon resin is prepared by the process comprising, in combination, the steps of,
   (A) agitating a mixture of
      (1) organohalosilane,
      (2) from about 1.7 parts to about 10 parts by weight of water, per part of organohalosilane,
      (3) from about 0.2 to about 5 parts by weight of acetone, per part of organohalosilane,
      (4) from about 0.3 to about 5 parts by weight of a water immiscible organo solvent, per part of organohalosilane, and
      (5) from 0 to about one mole of an aliphatic monohydric alcohol having from 1 to 8 carbon atoms, per mole of halogen attached to the silicon or the organohalosilane,
   (B) separating an organic solvent solution of a silanol-containing polyorganosiloxane having an average ratio of from about 1 to 1.8 organo radicals per silicon atom from the resulting hydrolysis mixture, said organohalosilane being selected from the group consisting of,
      (6) organotrihalosilane,
      (7) a mixture of organotrihalosilane and diorganodihalosilane,
      (8) a reaction product of an aliphatic monohydric alcohol having from 1 to 8 carbon atoms and a member selected from the group consistng of organotrihalosilane, and a mixture of organotrihalosilane and diorganodihalosilanes; which reaction product has an average ratio of up to one alkoxy radical per halogen radical,
      (9) a mixture of the reaction product of (c) and a member selected from the organotrihalosilane and diorganodihalosilane,
and where the organo radicals of the organohalosilane and the silanol-containing polyorganosilane are attached to silicon by carbon silicon linkages and are selected from the group consisting of monovalent hydrocarbon radicals, halogenated monovalent hydrocarbon radicals, and cyanoalkyl radicals.

3. The composition of Claim 1 which further includes a curing agent.

4. A composition of Claim 3 wherein said curing agent comprises (1) a lead compound selected from the group consisting of lead carbonate, lead monoxide, and mixtures thereof; and (2) a compound selected from the group consisting of carboxylic acids, ammonium salts of carboxylic acids, and anhydrides of carboxylic acids.

5. The composition of Claim 1 wherein said filler is a fused silica having a particle diameter of less than 300 microns.

6. The composition of Claim 1 wherein the amount of said filler is between about 40 and about 70% by weight based upon the combined weight of (a) and (b).

7. The composition of Claim 1 wherein said pretreated filler is obtained by calcining for at least about 1 hour at a temperature from about 250° C. to about 1372° C.

8. The composition of Claim 6 wherein said filler is a fused silica having a particle diameter of less than 45 microns, a surface area of 7–11 m.²/gram, and a pH of 5.0–6.0 before being calcined.

9. The composition of Claim 1 wherein said pretreated filler is obtained by calcining for about 3 to 10 hours at a temperature of about 350° C to 600° C.

10. The process of Claim 2 which comprises calcining said filler for about 3 to 10 hours at a temperature of about 350° C. to 600° C.

11. The process of Claim 10 wherein said filler is a fused silica having a particle diameter of less than 45 microns, a surface area of 7–11 m.²/gram, and a pH of 5.0–6.0 before being calcined.

12. The composition of Claim 1 wherein said uncured silicone resin is comprised of from 3% to 12% by weight of silicon bonded hydroxyl groups.

13. The process of Claim 2 wherein said uncured silicone resin is comprised of from 3% to 12% by weight of silicon bonded hydroxyl groups.

14. The composition of Claim 1 wherein said uncured silicone resin is comprised of from 3% to 7% by weight of silicon bonded hydroxyl groups.

15. The process of Claim 2 wherein said uncured silicone resin is comprised of from 3% to 7% by weight of silicone bonded hydroxyl groups.

References Cited
UNITED STATES PATENTS

| | | | |
|---|---|---|---|
| 3,274,288 | 9/1966 | Harris et al. | 260—46.5 R X |
| 2,646,441 | 7/1953 | Duane | 260—46.5 R X |
| 3,135,713 | 6/1964 | Brewer et al. | 260—46.5 R |
| 3,108,985 | 10/1963 | Weyer | 260—37 S B |
| 3,178,388 | 4/1965 | Burke et al. | 106—288 B X |
| 3,208,823 | 9/1965 | Baker et al. | 106—288 B UX |

LEWIS T. JACOBS, Primary Examiner

UNITED STATES PATENT AND TRADEMARK OFFICE
CERTIFICATE OF CORRECTION

PATENT NO. : 3,826,773
DATED : July 30, 1974
INVENTOR(S) : Richard C. Cooke, Jr.

It is certified that error appears in the above-identified patent and that said Letters Patent are hereby corrected as shown below:

Claim 1, line 74 "argonotrihalosilane" should read --organotrihalosilane--.

Claim 2, line 48, "organo" should read --organic--;
line 65, "consistng" should read --consisting--

Signed and sealed this 15th day of July 1975.

(SEAL)
Attest:

RUTH C. MASON
Attesting Officer

C. MARSHALL DANN
Commissioner of Patents
and Trademarks